United States Patent
Ji

(10) Patent No.: US 11,667,294 B2
(45) Date of Patent: *Jun. 6, 2023

(54) VEHICLE LANE CHANGE CONTROL APPARATUS AND METHOD

(71) Applicant: HYUNDAI MOBIS CO., LTD., Seoul (KR)

(72) Inventor: Yong Kwan Ji, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,873

(22) Filed: Sep. 21, 2022

(65) Prior Publication Data

US 2023/0017222 A1 Jan. 19, 2023

Related U.S. Application Data

(63) Continuation of application No. 16/810,535, filed on Mar. 5, 2020, now Pat. No. 11,479,252.

(30) Foreign Application Priority Data

Mar. 11, 2019 (KR) .......................... 10-2019-0027567

(51) Int. Cl.
 B60W 30/18 (2012.01)
 B60W 30/14 (2006.01)
 (Continued)

(52) U.S. Cl.
 CPC ...... B60W 30/18163 (2013.01); B60W 10/20 (2013.01); B60W 30/146 (2013.01);
 (Continued)

(58) Field of Classification Search
 CPC ......... B60W 10/20; B60W 2040/0818; B60W 2050/0075; B60W 2540/01;
 (Continued)

(56) References Cited

U.S. PATENT DOCUMENTS

2007/0083318 A1* 4/2007 Parikh .................... H04L 67/52
 180/170
2010/0023245 A1* 1/2010 Huang .................. B60W 30/12
 701/300

(Continued)

FOREIGN PATENT DOCUMENTS

JP 2015-150979 A 8/2015
KR 10-2009-0054171 A 5/2009

(Continued)

OTHER PUBLICATIONS

Korean Office Action dated Feb. 22, 2023, in counterpart Korean Patent Application No. 10-2019-0027567 (6 pages in Korean).

*Primary Examiner* — Babar Sarwar
(74) *Attorney, Agent, or Firm* — NSIP Law

(57) ABSTRACT

A vehicle lane change control apparatus includes a condition information acquisition unit that acquires condition information of an occupant of a vehicle, a lane change rate database unit that stores a lane change rate that is determined based on a lane change pattern of a driver analyzed based on driving information when a lane of the vehicle is changed and road condition information when the lane of the vehicle is changed and indicates a speed of the lane change, and a control unit that changes the lane of the vehicle through steering control according to operation information of the vehicle, and based on the condition information of the occupant acquired by the condition information acquisition unit, controls the lane change of the vehicle by selectively using the lane change rate and a corrected lane change rate determined by increasing or decreasing the lane change rate.

18 Claims, 6 Drawing Sheets

(51) Int. Cl.
  *B60W 10/20* (2006.01)
  *B60W 40/09* (2012.01)
  *B60W 40/06* (2012.01)
  *B60W 50/14* (2020.01)
  *H04W 4/90* (2018.01)
  *G06V 20/59* (2022.01)
  *B60W 40/08* (2012.01)

(52) U.S. Cl.
  CPC ............ *B60W 40/06* (2013.01); *B60W 40/09* (2013.01); *B60W 50/14* (2013.01); *G06V 20/59* (2022.01); *H04W 4/90* (2018.02); *B60W 2040/0818* (2013.01); *B60W 2540/01* (2020.02); *B60W 2540/18* (2013.01); *B60W 2540/221* (2020.02); *B60W 2540/229* (2020.02); *B60W 2540/26* (2013.01)

(58) Field of Classification Search
  CPC ....... B60W 2540/18; B60W 2540/221; B60W 2540/229; B60W 2540/26; B60W 2556/10; B60W 2710/207; B60W 2720/10; B60W 30/143; B60W 30/146; B60W 30/18163; B60W 40/06; B60W 40/09; B60W 50/14; G06K 9/00832; G06K 9/00845; H04W 4/027; H04W 4/40; H04W 4/90
  See application file for complete search history.

(56) References Cited

U.S. PATENT DOCUMENTS

| 2010/0274440 | A1 | 10/2010 | Kim et al. | |
| 2013/0231830 | A1* | 9/2013 | Van Dan Elzen | B60W 50/16 701/41 |
| 2017/0057517 | A1* | 3/2017 | Huq | B60W 30/16 |
| 2017/0349175 | A1* | 12/2017 | Brandin | B60W 30/18163 |

FOREIGN PATENT DOCUMENTS

| KR | 10-2014-0133320 A | 11/2014 | |
| KR | 10-2017-0086895 A | 7/2017 | |
| WO | WO-2009/074656 A1 | 6/2009 | |
| WO | WO-2009074656 A1 * | 6/2009 | ............ B60W 30/16 |

* cited by examiner

VEHICLE LANE CHANGE CONTROL APPARATUS AND METHOD

CROSS-REFERENCE TO RELATED APPLICATION

This application is a continuation of U.S. patent application Ser. No. 16/810,535 filed on Mar. 5, 2020, which claims priority under 35 U.S.C. § 119(a) to Korean Patent Application No. 10-2019-0027567 filed on Mar. 11, 2019 in the Korean Intellectual Property Office, which is incorporated herein by reference in its entirety.

BACKGROUND

1. Technical Field

Embodiments of the present disclosure relate to a vehicle lane change control apparatus and method, and more particularly, to a vehicle lane change control apparatus and method for controlling the speed of a lane change of a vehicle.

2. Related Art

An adaptive cruise control (ACC) system refers to a system that controls driving of a vehicle based on a radar mounted on a front side of the vehicle while maintaining a driving speed and a distance to a preceding vehicle set in advance by a driver. Such an ACC system controls the driving of the vehicle at the driving speed set by the driver without using an accelerator pedal and a brake pedal. The ACC system also provides a function of automatically stopping the vehicle when the vehicle encounters a preceding vehicle stopped at an intersection during driving and then automatically starting the vehicle when the preceding vehicle starts. Therefore, the application of the ACC system has a tendency to increase.

In a case where the driving of the vehicle is automatically controlled by the ACC system, when a lane change is performed by automatic steering control, the lane change needs to be performed at a speed desired by the driver. That is, it is necessary to solve drivers' anxiety or frustration caused by the lane change process by controlling the lane change after determining whether to change the lane quickly or relatively slowly in consideration of the characteristics of the driver.

In addition, even though the lane change is controlled through the speed of the lane change determined in consideration of the characteristics of the driver, it is necessary to correct the speed of the lane change according to the conditions of a passenger riding with the driver in the vehicle. That is, there is a need for a system that controls the lane change in consideration of both the characteristics and conditions of the driver and the passenger.

The related art of the present disclosure is disclosed in Korean Patent Application Laid-Open No. 10-2017-0086895 published on Jul. 27, 2017.

SUMMARY

Various embodiments are directed to providing a vehicle lane change control apparatus and method capable of removing drivers' anxiety or frustration caused by a lane change process and simultaneously improving the safety of a lane change of a vehicle by controlling the lane change such that the lane change is performed at a speed determined in consideration of the characteristics of a driver and the conditions of a passenger when the lane change is performed through automatic steering control in a process in which driving of the vehicle is controlled by an ACC system including at least a processor.

In an embodiment, a vehicle lane change control apparatus may include: a condition information acquisition unit configured to acquire condition information of an occupant of a vehicle; a lane change rate database unit configured to store a lane change rate that is determined based on a lane change pattern of a driver analyzed based on driving information of the vehicle when a lane of the vehicle is changed and road condition information when the lane of the vehicle is changed and indicates a speed of the lane change of the vehicle; and a control unit configured to change the lane of the vehicle through steering control according to operation information of the vehicle, and based on the condition information of the occupant acquired by the condition information acquisition unit, to control the lane change of the vehicle by selectively using the lane change rate stored in the lane change rate database unit and a corrected lane change rate determined by increasing or decreasing the lane change rate.

In the present disclosure, the lane change rate may be mapped to an entry steering angle and an entry speed for entering a target lane when the lane of the vehicle is changed, and be stored in the lane change rate database unit, and when controlling the lane change of the vehicle by using the lane change rate, the control unit may control the lane change of the vehicle according to the entry steering angle and the entry speed mapped to the lane change rate.

In the present disclosure, when controlling the lane change of the vehicle by using the corrected lane change rate, the control unit may control the lane change of the vehicle by adjusting the entry steering angle and the entry speed.

In the present disclosure, when controlling the lane change of the vehicle by using a first corrected lane change rate determined by decreasing the lane change rate, the control unit may control the lane change of the vehicle by decreasing the entry steering angle and the entry speed, and when controlling the lane change of the vehicle by using a second corrected lane change rate determined by increasing the lane change rate, the control unit may control the lane change of the vehicle by increasing the entry steering angle and the entry speed.

In the present disclosure, in a case where a passenger other than the driver is not riding in the vehicle, when a driving concentration level of the driver determined based on condition information of the driver acquired by the condition information acquisition unit is equal to or more than a preset threshold concentration level, the control unit may control the lane change of the vehicle by using the lane change rate.

In the present disclosure, in the case where the passenger other than the driver is not riding in the vehicle, when the driving concentration level of the driver determined based on the condition information of the driver acquired by the condition information acquisition unit is less than the preset threshold concentration level, the control unit may control the lane change of the vehicle by using the first corrected lane change rate.

In the present disclosure, in a case where the passenger other than the driver is riding in the vehicle, when a distraction level of the passenger determined based on condition information of the passenger acquired by the condition information acquisition unit is less than a preset threshold distraction level, the control unit may control the lane change of the vehicle by using the lane change rate.

In the present disclosure, in the case where the passenger other than the driver is riding in the vehicle, when the distraction level of the passenger determined based on the condition information of the passenger acquired by the condition information acquisition unit is equal to or more than the preset threshold distraction level, the control unit may control the lane change of the vehicle by using the first corrected lane change rate.

In the present disclosure, when it is determined that an emergency situation has occurred in the passenger based on the condition information of the passenger acquired by the condition information acquisition unit, the control unit may control the lane change of the vehicle by using the second corrected lane change rate.

The present disclosure further include a warning unit, and, when the driving concentration level of the driver of the vehicle is less than the preset threshold concentration level, when the distraction level of the passenger of the vehicle is equal to or more than the preset threshold distraction level, or when it is determined that the emergency situation has occurred in the passenger of the vehicle, the control unit may output a warning through the warning unit.

In the present disclosure, the lane change control apparatus may be applied to an adaptive cruise control (ACC) system.

In an embodiment, a vehicle lane change control method may include: receiving, by a control unit, a lane change rate of a driver stored in a lane change rate database unit, the lane change rate database unit storing the lane change rate that is determined based on a lane change pattern of the driver analyzed based on driving information of a vehicle when a lane of the vehicle is changed and road condition information when the lane of the vehicle is changed and indicates a speed of the lane change of the vehicle; acquiring, by the control unit, condition information of an occupant of the vehicle; and changing, by the control unit, the lane of the vehicle through steering control according to operation information of the vehicle, and based on the acquired condition information of the occupant, controlling the lane change of the vehicle by selectively using the lane change rate received from the lane change rate database unit and a corrected lane change rate determined by increasing or decreasing the lane change rate.

According to an aspect of the present disclosure, the lane change is controlled in consideration of both the characteristics of a driver and the conditions of a passenger through a method of controlling the lane change by selectively utilizing the lane change rate as a database determined based on the driver's lane change pattern and the road condition information and the corrected lane change rate obtained by correcting the lane change rate according to the conditions of an occupant, so that it is possible to remove drivers' anxiety or frustration caused by the lane change process and simultaneously to improve the safety of the lane change.

DETAILED DESCRIPTION

Hereinafter, embodiments of a vehicle lane change control apparatus and method in accordance with the present disclosure will be described with reference to the accompanying drawings. In describing the vehicle lane change control apparatus and method, it should be noted that the drawings are not to precise scale and may be exaggerated in thickness of lines or sizes of components for descriptive convenience and clarity only. Furthermore, the terms used herein are defined by taking functions of the disclosure into account and can be changed according to the custom or intention of users or operators. Therefore, definition of the terms should be made according to the overall disclosures set forth herein.

Figure 1:
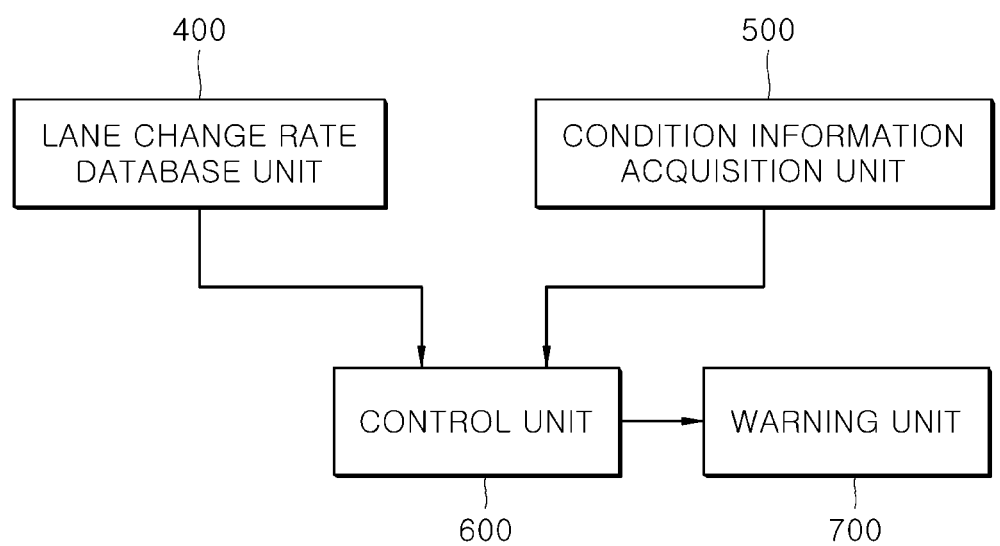
FIG. 1 is a block configuration diagram for explaining a vehicle lane change control apparatus in accordance with an embodiment of the present disclosure.
Figure 2:
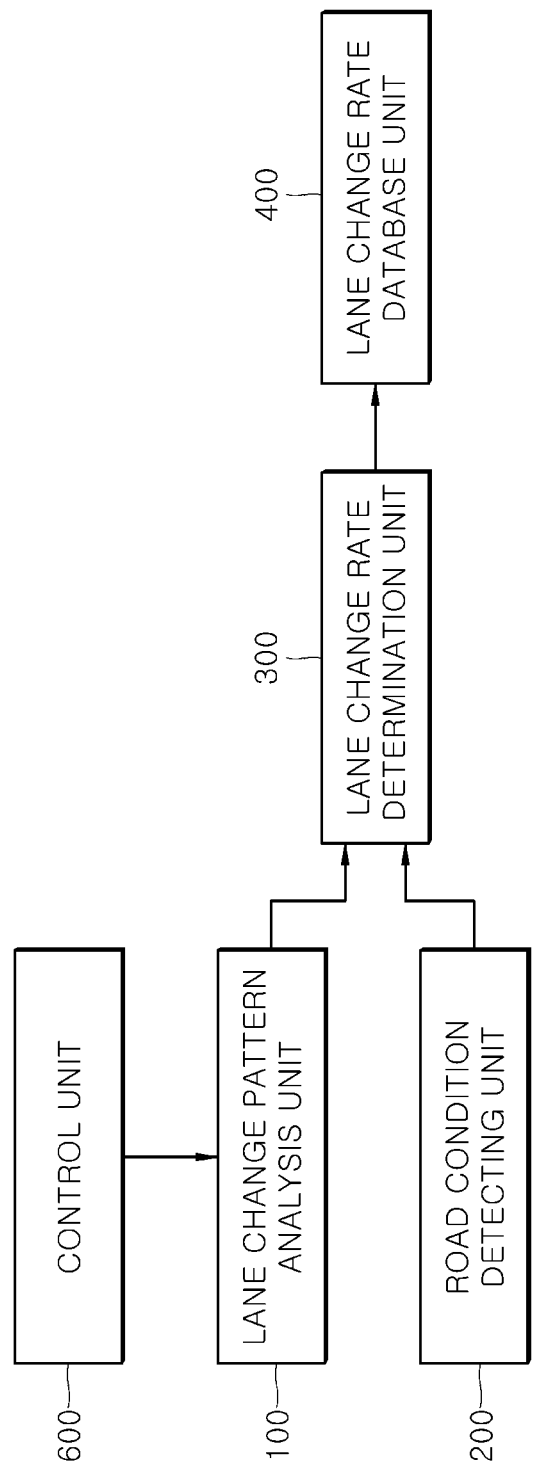
FIG. 2 is a block configuration diagram for explaining a process in which a lane change rate is stored in a lane change rate database unit and is databased in the vehicle lane change control apparatus in accordance with an embodiment of the present disclosure.
Figure 3:
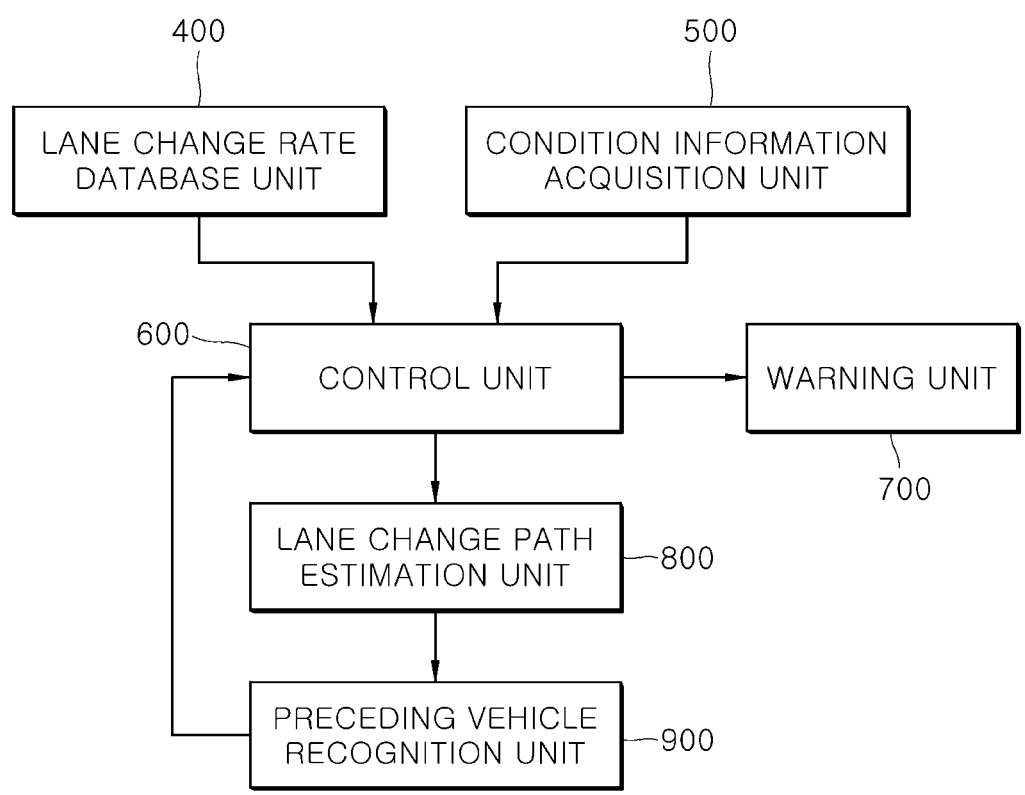
FIG. 3 is a block configuration diagram illustrating a configuration that may be added to substantially prevent a collision with a preceding vehicle in the vehicle lane change control apparatus in accordance with an embodiment of the present disclosure.

FIG. 1 is a block configuration diagram for explaining a vehicle lane change control apparatus in accordance with an embodiment of the present disclosure, FIG. 2 is a block configuration diagram for explaining a process in which a lane change rate is stored in a lane change rate database unit and is databased in the vehicle lane change control apparatus in accordance with an embodiment of the present disclosure, and FIG. 3 is a block configuration diagram illustrating a configuration that may be added to substantially prevent a collision with a preceding vehicle in the vehicle lane change control apparatus in accordance with an embodiment of the present disclosure.

Referring to FIG. 1, the vehicle lane change control apparatus in accordance with an embodiment of the present disclosure may include a lane change rate database unit 400, a condition information acquisition unit 500, a control unit 600 representative of at least a processor, and a warning unit 700.

The lane change rate database unit 400 is representative of at least the non-transitory storage that stores, as a database, a lane change rate that is determined based on a driver's lane change pattern analyzed based on driving information of a vehicle when the lane of the vehicle is changed and road condition information when the lane of the vehicle is changed and indicates a speed of the lane change of the vehicle.

The lane change rate employed in the present embodiment represents a parameter indicating the speed of the lane change of the vehicle as described above. The speed of the lane change depends on an entry steering angle (vehicle steering angle for determining an angle formed between the direction of entry into a target lane and the direction of the target lane) and an entry speed (may indicate the lateral speed of the vehicle) for entering the target lane when the lane of the vehicle is changed. That is, a small lane change rate indicates that the lane change may be performed slowly because the entry steering angle and the entry speed are small, and a large lane change rate indicates that the lane change may be performed quickly because the entry steering angle and the entry speed are large.

Such a lane change rate may be determined based on a driver's lane change pattern, which is analyzed based on the driving information of the vehicle when the lane of the vehicle is changed by the driver's manual driving, and road condition information (for example, the width, curvature, and gradient of a road in front of the vehicle, the number of lanes, and the like) when the lane of the vehicle is changed, and may be databased based on driving history of the vehicle and stored in the lane change rate database unit 400.

FIG. 2 illustrates a process in which the lane change rate is stored in the lane change rate database unit 400 and is databased, and in order to database the lane change rate, the present embodiment may include a lane change pattern analysis unit 100, a road condition detecting unit 200, and a lane change rate determination unit 300 as illustrated in FIG. 2.

The lane change pattern analysis unit 100 may analyze the driver's lane change pattern based on a steering angle (that is, a steering angle formed as a driver operates a steering wheel) when the lane change of the vehicle is changed, a time required for the vehicle to complete the lane change, and a speed of entering the target lane, which are the driving information of the vehicle. For example, based on a first steering angle at the time point at which the lane change of the vehicle has been started, a second steering angle at the time point at which the lane change of the vehicle has been completed, and a time taken to complete the lane change, the lane change pattern analysis unit 100 may analyze the lane change pattern regarding how long and at what steering angle the driver changed the lane. In such a case, the starting time point of the lane change may be a time point at which the steering angle of the vehicle has reached a preset threshold steering angle, a time point at which the display direction of a direction indictor of the vehicle coincides with the direction of the steering angle of the vehicle, or a time point at which the steering angle of the vehicle is determined to be equal to or more than the preset threshold steering angle in a state in which the display direction of the direction indictor of the vehicle coincides with the direction of the steering angle of the vehicle, and the completion time point of the lane change may be a time point at which the direction indictor of the vehicle has been turned off.

The road condition detecting unit 200 may detect the condition of a road (for example, the width, curvature, and gradient of a road in front of the vehicle, the number of lanes, and the like) when the lane of the vehicle is changed, and detect the condition of the road, for example, by extracting condition information of the road from pre-stored map information (for example, an advanced driver assistance system (ADAS) map) based on the current position of the vehicle, which is measured from a GPS module applied to the vehicle.

The lane change rate determination unit 300 may determine the lane change rate based on the driver's lane change pattern analyzed by the lane change pattern analysis and the condition information of the road detected by the road condition detecting unit 200. For example, the lane change rate determination unit 300 may determine the lane change rate by calculating a lane change pattern index indicating the speed of the lane change based on the analysis result of the lane change pattern and then increasing or decreasing the calculated lane change pattern index according to the degree of the condition information of the road (one or more of the width, curvature, and gradient of the road and the number of lanes may be utilized). Such a lane change rate may be databased according to the condition of the road and stored in the lane change rate database unit 400, and the control unit 600 to be described below may extract a lane change rate corresponding to road condition information acquired in the driving process of the vehicle (that is, an adaptive cruise control process) from the lane change rate database unit 400 and then control the lane change of the vehicle by using the extracted lane change rate.

The lane change rate determined by the aforementioned process indicates the speed of the lane change, and to this end, the lane change rate may be mapped to the entry steering angle and the entry speed for entering the target lane when the lane of the vehicle is changed based on the analysis result of the lane change pattern analysis unit 100. Accordingly, when controlling the lane change, the control unit 600 may control the lane change through the entry steering angle and the entry speed mapped to the lane change rate.

The condition information acquisition unit 500 may acquire condition information of an occupant of the vehicle and transmit the condition information to the control unit 600 to be described below, and the occupant of the vehicle may indicate one or more of a driver and a passenger. The condition information of the occupant may include an activity state such as the behavior of the occupant and biometric information such as the heart rate, pulse rate, and blood pressure of the occupant, and in order to acquire such condition information, the condition information acquisition unit 500 may include an internal camera installed in the vehicle and configured to photograph the occupant and a biometric sensor configured to detect the biometric information of the occupant.

The control unit 600 may operate to change the lane of the vehicle through steering control according to operation information of the vehicle. The operation information of the vehicle may indicate a driver's direction indicator operation, and accordingly, when there is the driver's direction indicator operation, the control unit 600 may change the lane of the vehicle through automatic steering control in a corresponding direction. In the embodiment, the control unit 600 may basically change the lane of the vehicle by controlling the steering of the vehicle based on the lane change rate stored in the lane change rate database unit 400, that is, the lane change rate determined based on the driver's lane change pattern and the road condition information. In such a case, the control unit 600 may extract the lane change pattern corresponding to the condition of the road acquired by the road condition detecting unit 200 in the driving process of the vehicle from the lane change rate database unit 400, and then control the lane change of the vehicle according to the entry steering angle and the entry speed mapped to the extracted lane change rate. The control unit 600 may adjust the entry steering angle by controlling a motor driven power steering (MDPS) motor applied to the vehicle (that is, control the steering angle of the vehicle to be the entry steering angle), and may also adjust the entry speed through an engine control system (for example, an engine control unit) or a transmission control system (transmission control unit) applied to the vehicle.

In such a case, the control unit 600 may control the lane change of the vehicle by selectively using the lane change rate stored in the lane change rate database unit 400 and a corrected lane change rate determined by increasing or decreasing the lane change rate, according to the condition information of the occupant acquired by the condition information acquisition unit 500. When controlling the lane change of the vehicle by using the corrected lane change rate, the control unit 600 may control the lane change of the vehicle by adjusting the entry steering angle and the entry speed.

Based on the aforementioned description, the process in which the control unit 600 controls the lane change of the vehicle by using the lane change rate or the corrected lane change rate will be summarized as follows.

When controlling the lane change by using the lane change rate stored in the lane change rate database unit 400, the control unit 600 may control the lane change of the vehicle according to the entry steering angle and the entry speed mapped to the lane change rate.

When controlling the lane change of the vehicle by using a first corrected lane change rate determined by decreasing the lane change rate, the control unit 600 may control the lane change of the vehicle by decreasing the entry steering angle and the entry speed. A decrease amount of the first corrected lane change rate to the lane change rate and decrease amounts of the entry steering angle and the entry speed due to the reduction in the first corrected lane change rate may be predesigned according to a designer's intention (for example, the first corrected lane change rate=the lane change rate*0.6).

When controlling the lane change of the vehicle by using a second corrected lane change rate determined by increasing the lane change rate, the control unit 600 may control the lane change of the vehicle by increasing the entry steering angle and the entry speed. An increase amount of the second corrected lane change rate to the lane change rate and increase amounts of the entry steering angle and the entry speed due to the increase in the second corrected lane change rate may be predesigned according to the designer's intention (for example, the second corrected lane change rate=the lane change rate*1.6).

It is determined, according to whether a passenger other than a driver is riding and the condition information of the occupant, which parameter of the lane change rate, the first corrected lane change rate, and the second corrected lane change rate is used so as for the control unit 600 to control the lane change of the vehicle. Hereinafter, each lane change control process divided according to the condition information of the occupant will be described.

First, a case where a passenger other than a driver is not riding in the vehicle will be described.

In the case where a passenger other than the driver is not riding in the vehicle, when a driving concentration level of the driver determined based on the condition information of the driver acquired by the condition information acquisition unit 500 is equal to or more than a preset threshold concentration level, the control unit 600 may control the lane change of the vehicle by using the lane change rate stored in the lane change rate database unit 400. The driving concentration level of the driver is a numerical value of the condition information of the driver acquired by the condition information acquisition unit 500, and for example, may be a numerical parameter based on whether the driver keeps eyes forward. To this end, the control unit 600 is representative of at least the processor that implements a predetermined algorithm for calculating the driving concentration level by converting the condition information of the driver into a numerical value may be set in advance in the control unit 600. Furthermore, the threshold concentration level is a value serving as a reference for determining whether the driver concentrates on driving, and may be selected as an appropriate value according to a designer's intention and set in advance in the control unit 600.

Accordingly, when the driving concentration level of the driver is equal to or more than the threshold concentration level, since the lane change rate stored in the lane change rate database unit 400 may be effectively applied, the control unit 600 may control the lane change of the vehicle by using an uncorrected lane change rate.

When the driving concentration level of the driver is less than the threshold concentration level, the control unit 600 may control the lane change of the vehicle by using the first corrected lane change rate. That is, when the driving concentration level of the driver is less than the threshold concentration level, since it is necessary to give priority to safe driving and to slowly change the lane of the vehicle, the control unit 600 may control the lane change of the vehicle by using the first corrected lane change rate decreased from the lane change rate.

Next, a case where a passenger other than a driver is riding in the vehicle will be described.

In the case where a passenger other than the driver is riding in the vehicle, when a distraction level of the passenger determined based on the condition information of the passenger acquired by the condition information acquisition unit 500 is equal to or more than a preset threshold distraction level, the control unit 600 may control the lane change of the vehicle by using the first corrected lane change rate. The distraction level of the passenger is a numerical value of the condition information of the passenger acquired by the condition information acquisition unit 500, and for example, may be a numerical parameter based on whether the movement of the passenger hinders the driving of the driver. To this end, the control unit 600 is representative of at least the processor that implements a predetermined algorithm for calculating the distraction level by converting the condition information of the passenger into a numerical value may be set in advance in the control unit 600. Furthermore, the threshold distraction level is a value serving as a reference for determining a distracting behavior of the passenger, and may be selected as an appropriate value according to a designer's intention and set in advance in the control unit 600.

Accordingly, when the distraction level of the passenger is equal to or more than the threshold distraction level, since it is necessary to give priority to safe driving and to slowly change the lane of the vehicle, the control unit 600 may control the lane change of the vehicle by using the first corrected lane change rate decreased from the lane change rate.

When the distraction level of the passenger is less than the threshold distraction level, since the lane change rate stored in the lane change rate database unit 400 may be effectively applied, the control unit 600 may control the lane change of the vehicle by using an uncorrected lane change rate.

Meanwhile, when it is determined that an emergency situation has occurred in the passenger based on the condition information of the passenger acquired by the condition information acquisition unit 500, the control unit 600 may control the lane change of the vehicle by using the second corrected lane change rate.

That is, when it is determined that the emergency situation (for example, difficulty in breathing, cardiac arrest and the like) has occurred in the passenger based on the condition information of the passenger acquired by the condition information acquisition unit 500, since it is necessary to give priority to fast movement of the vehicle for taking emergency measures for the passenger, the control unit 600 may control the lane change of the vehicle by using the second corrected lane change rate increased from the lane change rate.

The control unit 600 may also warn the occupant together with the aforementioned lane change control. That is, when the driving concentration level of the driver is less than the threshold concentration level, when the distraction level of the passenger is equal to or more than the threshold distraction level, or when it is determined that the emergency situation has occurred in the passenger, the control unit 600 may also output a warning through the warning unit 700. Since the warning unit 700 may be implemented as a cluster or a speaker installed in the vehicle, the warning outputted through the warning unit 700 may be a warning phrase displayed on the cluster or a sound warning outputted through the speaker.

Meanwhile, in the present embodiment, a control logic may be further implemented to substantially prevent a collision with a preceding vehicle in a process of controlling the land change through the aforementioned process. To this end, the present embodiment may further include a lane change path estimation unit 800 and a preceding vehicle recognition unit 900 as illustrated in FIG. 3.

The lane change path estimation unit 800 may estimate a target lane to be changed from an original lane and a lane change path for entering the target lane. The lane change path estimation unit 800 may estimate the target lane and the lane change path immediately before the lane change is started.

The preceding vehicle recognition unit 900 may calculate an angle difference between the expected traveling direction of the vehicle and the current traveling direction of the vehicle due to the lane change path, recognize a preceding vehicle running on the target lane, and correct the position of the preceding vehicle at every predetermined time. That is, the preceding vehicle recognition unit 900 may calculate an angle between the direction of the estimated target lane and the vehicle traveling direction and correct the position of the preceding vehicle detected on the target lane based on the calculated angle, thereby recognizing the preceding vehicle.

Accordingly, the control unit 600 may control the lane change of the vehicle to substantially prevent a collision with the preceding vehicle based on the angle difference between the expected traveling direction of the vehicle and the current traveling direction of the vehicle, the corrected position of the preceding vehicle, and the lane change rate used in the land change control. The control unit 600 may perform the land change control for substantially preventing a collision with the preceding vehicle until the direction indicator is turned off or the angle difference between the expected traveling direction of the vehicle and the current traveling direction of the vehicle is equal to or less than a preset reference value.

The lane change control apparatus described above may be applied to an adaptive cruise control (ACC) system, and may be applied when the lane change of the vehicle is performed in the process of controlling the driving of the vehicle in the state of maintaining a preset distance to a preceding vehicle according to the adaptive cruise control.

Figure 4:
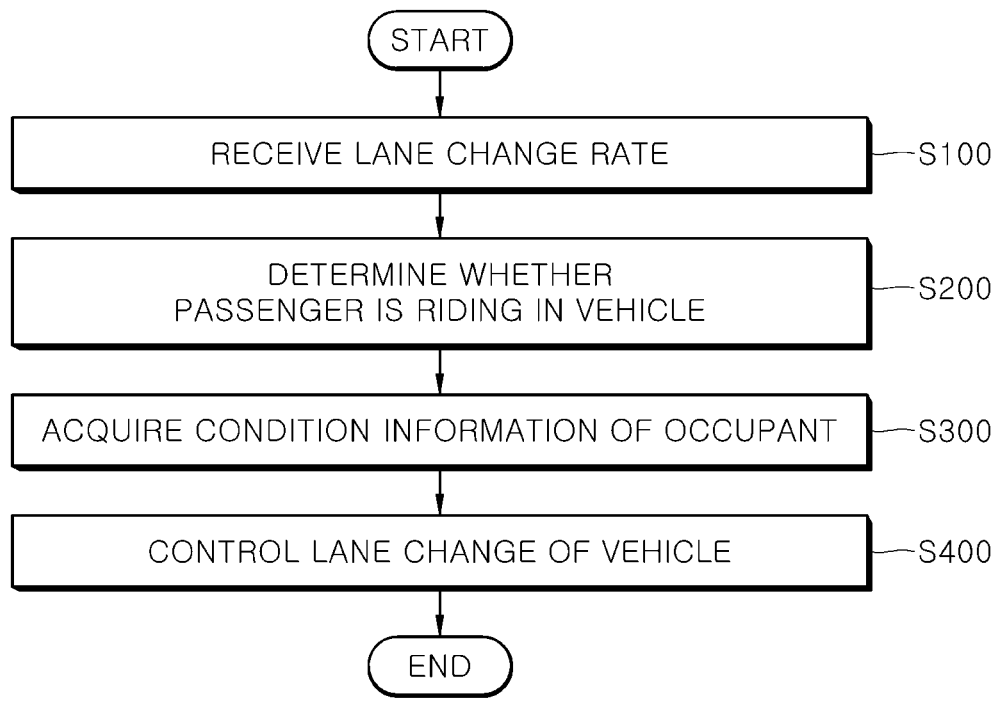
FIG. 4 to FIG. 6 are flowcharts for explaining a vehicle lane change control method in accordance with an embodiment of the present disclosure.
Figure 5:
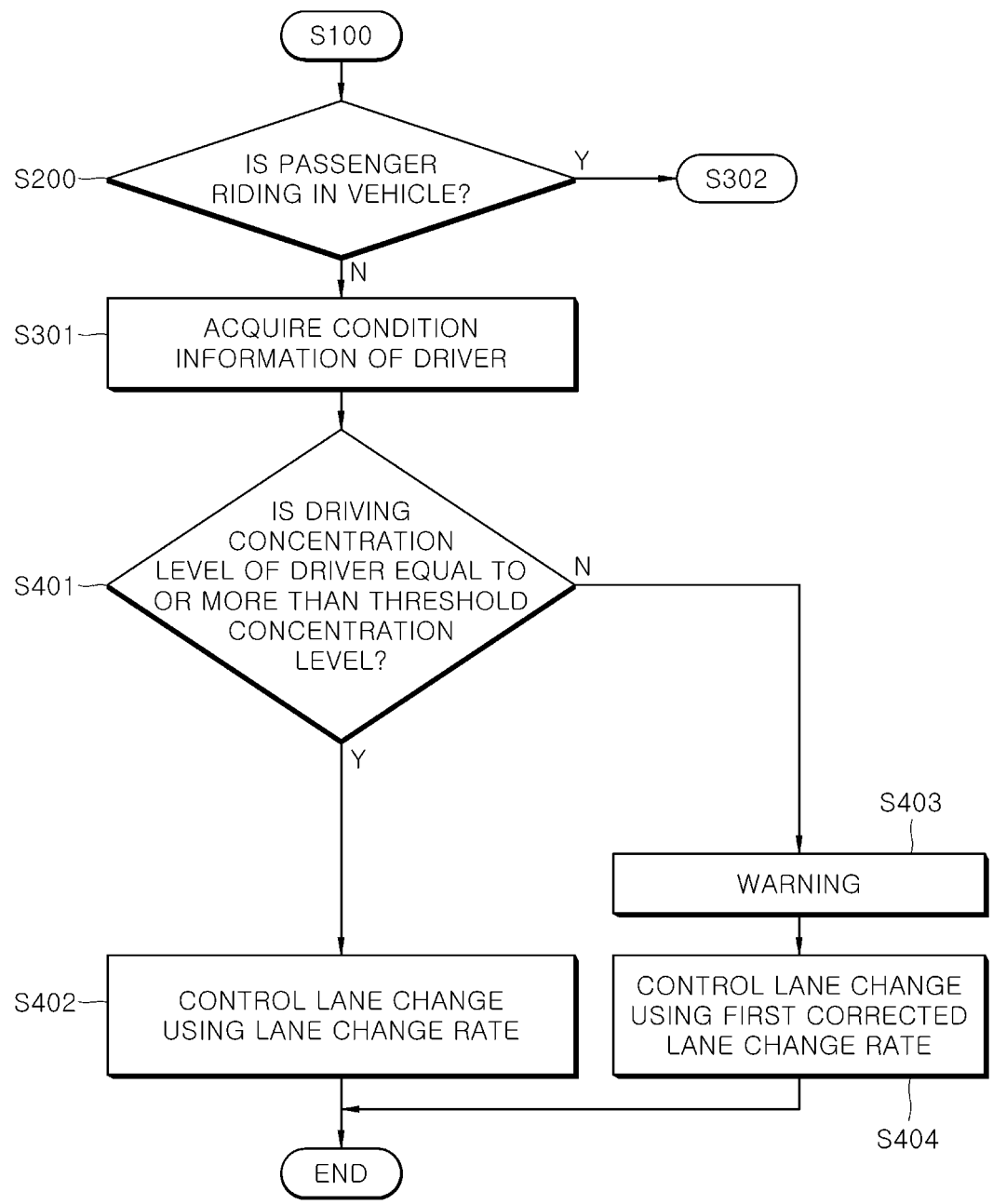
Figure 6:
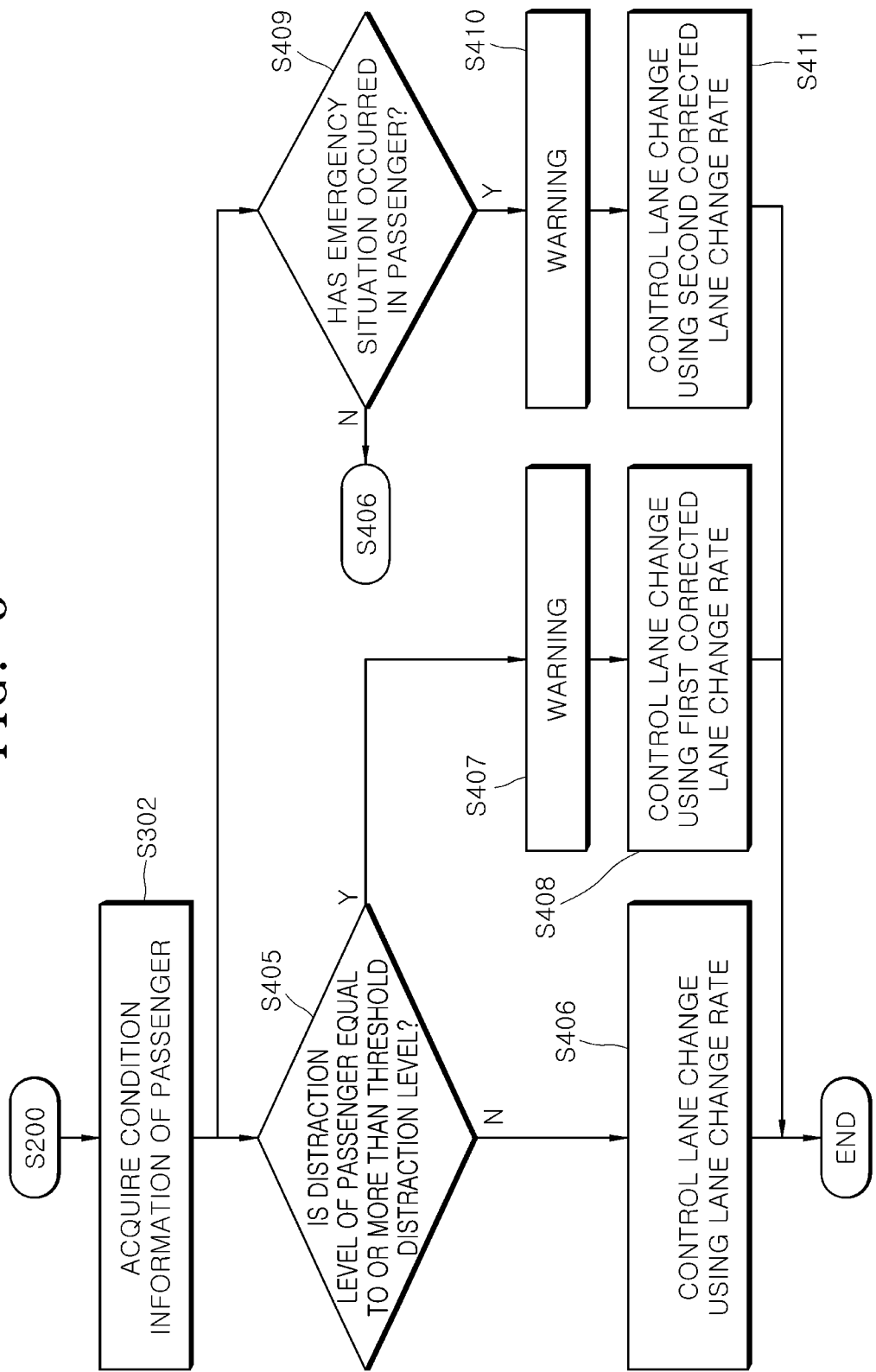

FIG. 4 to FIG. 6 are flowcharts for explaining a vehicle lane change control method in accordance with an embodiment of the present disclosure.

With reference to FIG. 4, the vehicle lane change control method in accordance with an embodiment of the present disclosure will be described. First, the control unit 600 receives the lane change rate of the driver stored in the lane change rate database unit 400 (S100), being at least a non-transitory storage. As described above, the lane change rate database unit 400 stores, as a database, the lane change rate in the storage that is determined based on the driver's lane change pattern analyzed based on the driving information of the vehicle when the lane of the vehicle is changed and the road condition information when the lane of the vehicle is changed and indicates the speed of the lane change of the vehicle.

Next, the control unit 600 determines whether a passenger other than the driver is riding in the vehicle (S200). In step S200, the control unit 600 may determine whether the passenger is riding in the vehicle by using a weight sensor provided in a passenger seat.

Then, the control unit 600 acquires the condition information of an occupant through the condition information acquisition unit 500 (S300). When it is determined in step S200 that no passenger is riding in the vehicle, the control unit 600 acquires the condition information of the driver in step S300 (S301), and when it is determined in step S200 that the passenger is riding in the vehicle, the control unit 600 acquires the condition information of the passenger in step S300 (S302).

Then, the control unit 600 changes the lane of the vehicle through steering control according to the operation information of the vehicle, and based on the condition information of the occupant acquired in step S300, the control unit 600 controls the lane change of the vehicle by selectively using the lane change rate received in step S100 and the corrected lane change rate determined by increasing or decreasing the lane change rate (S400) (the step of receiving the operation information of the vehicle may be performed before step S100). As described above, when controlling the lane change of the vehicle by using the lane change rate, the control unit 600 controls the lane change of the vehicle according to the entry steering angle and the entry speed mapped to the lane change rate. Furthermore, when controlling the lane change of the vehicle by using the corrected lane change rate, the control unit 600 controls the lane change of the vehicle by adjusting the entry steering angle and the entry speed. Specifically, when controlling the lane change of the vehicle by using the first corrected lane change rate determined by decreasing the lane change rate, the control unit 600 controls the lane change of the vehicle by decreasing the entry steering angle and the entry speed, and when controlling the lane change of the vehicle by using the second corrected lane change rate determined by increasing the lane change rate, the control unit 600 controls the lane change of the vehicle by increasing the entry steering angle and the entry speed.

With reference to FIG. 5, step S400 will be described in detail. When it is determined in step S200 that no passenger is riding in the vehicle, the control unit 600 determines whether the driving concentration level of the driver determined based on the condition information of the driver acquired in step S301 is equal to or more than the preset threshold concentration level (S401).

When the driving concentration level of the driver is equal to or more than the threshold concentration level, the control unit 600 controls the lane change of the vehicle by using the lane change rate received in step S100 (S402), and when the driving concentration level of the driver is less than the threshold concentration level, the control unit 600 controls the lane change of the vehicle by using the first corrected lane change rate (S404) after warning through the warning unit 700 (S403).

Next, referring to FIG. 6, when it is determined in step S200 that the passenger is riding in the vehicle, the control unit 600 determines whether the distraction level of the passenger determined based on the condition information of the passenger acquired in step S302 is equal to or more than the preset threshold distraction level (S405).

When the distraction level of the passenger is less than the threshold distraction level, the control unit 600 controls the lane change of the vehicle by using the lane change rate received in step S100 (S406), and when the distraction level of the passenger is equal to or more than the threshold distraction level, the control unit 600 controls the lane change of the vehicle by using the first corrected lane change rate (S408) after warning through the warning unit 700 (S407).

In step S400, the control unit 600 determines whether an emergency situation has occurred in the occupant based on the condition information of the occupant (S409). When the emergency situation has occurred in the passenger, the control unit 600 controls the lane change of the vehicle by using the second corrected lane change rate (S411) after warning through the warning unit 700 (S410).

The aforementioned step S100, step S200, step S300, and step S400 may be applied to a process in which the adaptive cruise control of the vehicle is performed.

As described above, according to the embodiment, the lane change is controlled in consideration of both the characteristics of a driver and the conditions of a passenger through a method of controlling the lane change by selectively utilizing the lane change rate as a database determined based on the driver's lane change pattern and the road condition information and the corrected lane change rate obtained by correcting the lane change rate according to the conditions of an occupant, so that it is possible to remove drivers' anxiety or frustration caused by the lane change process and simultaneously to improve the safety of the lane change.

Although the present disclosure have been described with reference to the embodiments illustrated in the drawings, the embodiments of the disclosure are for illustrative purposes only, and those skilled in the art will appreciate that various modifications and equivalent other embodiments are possible. Thus, the true technical scope of the disclosure should be defined by the following claims.

What is claimed is:

1. A vehicle lane change control apparatus, comprising:
   a non-transitory storage comprising a lane change rate database storing a lane change rate that is determined based on a lane change pattern of a driver analyzed based on driving information of a vehicle when a lane of the vehicle is changed and indicates a speed of the lane change of the vehicle; and
   a processor configured according to control logic to control the lane change of the vehicle by selectively using the lane change rate and a corrected lane change rate determined by adjusting the lane change rate,
   wherein the processor is further configured to:
   select one of the lane change rate and the corrected lane change rate; and
   determine the corrected lane change rate configured differently based on whether a passenger other than the driver is in the vehicle.

2. The vehicle lane change control apparatus according to claim 1,
   wherein the lane change rate is mapped to an entry steering angle and an entry speed for entering a target lane when the lane of the vehicle is changed and is stored in the lane change rate database of the storage, and
   wherein when controlling the lane change of the vehicle by using the lane change rate, the processor is configured to control the lane change of the vehicle according to the entry steering angle and the entry speed mapped to the lane change rate.

3. The vehicle lane change control apparatus according to claim 2,
   wherein, when the controlling of the lane change of the vehicle by using the corrected lane change rate, the processor is configured to control the lane change of the vehicle by adjusting the entry steering angle and the entry speed.

4. The vehicle lane change control apparatus according to claim 3,
   wherein the selective using of the corrected lane change rate comprises selecting one of a first corrected lane change rate and a second corrected lane change rate,
   wherein when the controlling of the lane change of the vehicle by using the first corrected lane change rate determined by decreasing the lane change rate, the processor is configured to control the lane change of the vehicle by decreasing the entry steering angle and the entry speed, and
   wherein when the controlling of the lane change of the vehicle by using the second corrected lane change rate determined by increasing the lane change rate, the processor is configured to control the lane change of the vehicle by increasing the entry steering angle and the entry speed.

5. The vehicle lane change control apparatus according to claim 1, further comprising:
   sensors, including at least one of an image sensor or a biometric sensor, configured to acquire condition information of an occupant of the vehicle,
   wherein a driving concentration level of the driver is used when the passenger other than the driver is not in the vehicle, and a distraction level of the passenger is used when the passenger other than the driver is in the vehicle, and
   wherein the driving concentration level of the driver and the distraction level of the passenger are determined based on the acquired condition information by the sensors.

6. The vehicle lane change control apparatus according to claim 5,
   wherein, in a case where the passenger other than the driver is not in the vehicle,
   when the driving concentration level of the driver is equal to or more than a preset threshold concentration level, the processor is configured to control the lane change of the vehicle by using the lane change rate, and
   when the driving concentration level of the driver is less than the preset threshold concentration level, the processor is configured to control the lane change of the vehicle by using a first corrected lane change rate determined by decreasing the lane change rate.

7. The vehicle lane change control apparatus according to claim 5,
   wherein, in a case where the passenger other than the driver is in the vehicle,
   when the distraction level of the passenger is less than a preset threshold distraction level, the processor is configured to control the lane change of the vehicle by using the lane change rate, and
   when the distraction level of the passenger is equal to or more than the preset threshold distraction level, the processor is configured to control the lane change of the vehicle by using a first corrected lane change rate determined by decreasing the lane change rate.

8. The vehicle lane change control apparatus according to claim 5,
wherein, when it is determined that an emergency situation has occurred in the passenger based on the condition information of the passenger acquired by the sensors, the processor is configured to control the lane change of the vehicle by using a second corrected lane change rate determined by increasing the lane change rate.

9. The vehicle lane change control apparatus according to claim 5, further comprising:
a cluster or speaker,
wherein, when the driving concentration level of the driver of the vehicle is less than a preset threshold concentration level, when the distraction level of a passenger of the vehicle is equal to or more than a preset threshold distraction level, or when it is determined that an emergency situation has occurred in the passenger of the vehicle, the processor is configured to output a warning using the cluster or the speaker.

10. The vehicle lane change control apparatus according to claim 1, wherein the lane change control apparatus is applied to an adaptive cruise control (ACC) system.

11. A vehicle lane change control method, the method comprising:
receiving, by a processor, a lane change rate of a driver stored in a lane change rate database stored in a non-transitory storage, the lane change rate database storing the lane change rate that is determined based on a lane change pattern of the driver analyzed based on driving information of a vehicle when a lane of the vehicle is changed and indicates a speed of the lane change of the vehicle; and
controlling, by the processor, the lane change of the vehicle by selectively using the lane change rate and a corrected lane change rate determined by adjusting the lane change rate,
wherein the processor is configured to:
select one of the lane change rate and the corrected lane change rate; and
determine the corrected lane change rate configured differently based on whether a passenger other than the driver is in the vehicle.

12. The vehicle lane change control method according to claim 11,
wherein the lane change rate is mapped to an entry steering angle and an entry speed for entering a target lane when the lane of the vehicle is changed and is stored in the lane change rate database, and
wherein when controlling the lane change of the vehicle by using the lane change rate, the processor is configured to control the lane change of the vehicle according to the entry steering angle and the entry speed mapped to the lane change rate.

13. The vehicle lane change control method according to claim 12,
wherein, when the controlling of the lane change of the vehicle by using the corrected lane change rate, the processor is configured to control the lane change of the vehicle by adjusting the entry steering angle and the entry speed.

14. The vehicle lane change control method according to claim 13,
wherein the selective using of the corrected lane change rate comprises selecting one of a first corrected lane change rate and a second corrected lane change rate,
wherein when the controlling of the lane change of the vehicle by using the first corrected lane change rate determined by decreasing the lane change rate, the processor is configured to control the lane change of the vehicle by decreasing the entry steering angle and the entry speed, and
wherein when the controlling of the lane change of the vehicle by using the second corrected lane change rate determined by increasing the lane change rate, the processor is configured to control the lane change of the vehicle by increasing the entry steering angle and the entry speed.

15. The vehicle lane change control method according to claim 11, further comprising:
acquiring, using sensors including at least one of an image sensor or a biometric sensor, condition information of an occupant of the vehicle,
wherein a driving concentration level of the driver is used when the passenger other than the driver is not in the vehicle, and a distraction level of the passenger is used when the passenger other than the driver is in the vehicle, and
wherein the driving concentration level of the driver and the distraction level of the passenger are determined based on the acquired condition information by the sensors.

16. The vehicle lane change control method according to claim 15, further comprising:
determining, by the processor, whether the passenger other than the driver is in the vehicle,
wherein the controlling of the lane change comprises:
determining, by the processor, whether, when the passenger is not in the vehicle, the driving concentration level of the driver is equal to or more than a preset threshold concentration level;
controlling, by the processor, the lane change of the vehicle by using the lane change rate when the driving concentration level of the driver is equal to or more than the preset threshold concentration level; and
controlling, by the processor, the lane change of the vehicle by using a first corrected lane change rate determined by decreasing the lane change rate when the driving concentration level of the driver is less than the preset threshold concentration level.

17. The vehicle lane change control method according to claim 15, further comprising:
determining, by the processor, whether the passenger other than the driver is riding in the vehicle,
wherein the controlling of the lane change comprises:
determining, by the processor, whether, when the passenger is riding in the vehicle, the distraction level of the passenger is equal to or more than a preset threshold distraction level;
controlling according to the second mechanism, by the processor, the lane change of the vehicle by using the lane change rate when the distraction level of the passenger is less than the preset threshold distraction level; and
controlling according to the second mechanism, by the processor, the lane change of the vehicle by a first corrected lane change rate determined by decreasing the lane change rate when the distraction level of the passenger is equal to or more than the preset threshold distraction level.

18. The vehicle lane change control method according to claim 15, wherein the controlling of the lane change comprises:

determining, by the processor, whether an emergency situation has occurred in the passenger based on the condition information of the passenger acquired by the sensors; and controlling, by the processor, the lane change of the vehicle by using a second corrected lane change rate determined by increasing the lane change rate when the emergency situation has occurred in the passenger.

\* \* \* \* \*